INVENTOR
GOTTFRIED TSCHANNEN
By Marshall and Jarvis [signature]
Attorneys

INVENTOR
GOTTFRIED TSCHANNEN
By McGlew and Toren
Attorneys

United States Patent Office 3,473,129

Patented Oct. 14, 1969

3,473,129
CIRCUIT ARRANGEMENT FOR THE PRODUCTION OF TWO PULSE SERIES PHASE-SHIFTED BY 90°

Gottfried Tschannen, Zurich, Switzerland, assignor to Albiswerk Zurich A.G., Zurich, Switzerland Filed May 2, 1966, Ser. No. 547,014
Claims priority, application Switzerland, June 4, 1965, 7,870/65
Int. Cl. H03k *5/159*
U.S. Cl. 328—55 6 Claims

ABSTRACT OF THE DISCLOSURE

A circuit arrangement produces two output pulse series phase-shifted relative to each other by 90°, with one series being selectively controllable either to lead or to lag the other series. The circuit arrangement includes first and second frequency divider stages, producing output pulse series, means producing two control pulse series phase-shifted relative to each other by 180°, circuit means applying the control pulse series to control the first and second frequency divider stages, and a source of potential selectively switchable between a constant potential and zero potential. A gating circuit has an output connected to at least one input of the second frequency divider stage, and circuit means apply output pulses of the first divider stage, one of the control pulse series and the source of potential to the gating stage. The selected potential of the source determines whether the output pulse series of the second divider stage leads or lags, by 90°, the ouput pulse series of the first frequency divider stage.

Background of the invention

In order to determine whether the frequency of an oscillation sin $\omega t$ deviates from the frequency of a reference oscillation sin $\omega_0 t$, it is necessary to determine the frequency difference sin $\Delta\omega t$ between the two oscillations. As is known to those skilled in the art, the difference frequency sin $\Delta\omega t$ can be obtained by mixing the two oscillations and filtering out the difference frequency. However, the difference frequency sin $\Delta\omega t$ thus obtained does not have the information as to whether the frequency of the test oscillation sin $\omega t$ is higher or lower than the frequency of the reference oscillation sin $\omega_0 t$. The mathematical calculation does provide the change of sign relative to the direction of deviation of sin $\omega t$ relative to sin $\omega_0 t$, which is not apparent from derived difference frequency sin $\Delta\omega t$. The mathematical change of sign could be utilized, however, if a phase shift were introduced during the derivation, as any such phase shift is maintained during mixing.

For example, if the phase of the reference oscillation sin $\omega_0 t$ is shifted by 90° (sin $\omega_0 t \pm 90°$), the following comparison is obtained:

$$\omega t < \omega_0 t + 90° \therefore \Delta\omega t = \omega_0 t - \omega t + 90°$$

$$\omega t > \omega_0 t + 90° \therefore \Delta\omega t = \omega t - \omega_0 t - 90°$$

In the foregoing, $\omega$ is the frequency of the test oscillation sin $\omega t$, $\omega_0$ is the frequency of the reference oscillation sin $\omega_0 t$, and $\Delta\omega$ is the difference frequency sin $\Delta\omega t$. For the foregoing comparison, it will be clear that the phase of the difference frequency differs by 180° in dependence on whether the frequency of the test oscillation is higher or is lower than the frequency of the reference oscillation. However, since the phase difference can be measured only between two oscillations of equal frequency, the difference frequency must be developed twice. Thus, it is developed once as a difference frequency between the test oscilation sin $\omega t$ and the reference oscillation sin $\omega_0 t$, and developed a second time as the difference frequency between the test oscillation sin $\omega t$ and the phase shifted reference oscillation sin $(\omega_0 t \pm 90°)$.

Furthermore, in order to determine whether the frequency of the test oscillation is higher or lower than the frequency of the reference or standard oscillation, it is not necessary to determine the exact phase angle. Thus, the frequency determination can be made of the oscillations are present as rectangular voltages.

The generation of a signal which is phase shifted by 90° is possible with known phase shifters but only for a specific frequency in each case. This presents the problem of providing a circuit arrangement for the generation of pulse series which are phase shifted by 90° in relation to each other and one of which series can be made to lead or lag without respect to the other.

Summary of the invention

This invention relates to frequency deviation determining circuits and, more particularly, to a novel circuit arrangement for the production of two pulse series which are phase-shifted, relative to each other, by 90° and one of which, with the aid of an auxiliary potential, can be made selectively to lead or lag the other.

An object of the invention is to provide a circuit arrangement for the generation of pulse series which can be phase shifted by 90° in relation to each other.

Another object of the invention is to provide a circuit arrangement for the generation of pulse series which are phase shifted by 90° in relation to each other and one of which series can be made either to lead or to lag with respect to the other.

A further object of the invention is to provide a circuit arrangement for the generation of such pulse series including a gating stage, a first divider stage, a second divider stage and a source of control voltage which may be switched between a positive potential and zero potential.

Yet another object of the invention is to provide such a circuit arrangement as just described in which, at the gating stage, output pulses for the first divider stage, one of the pulse series for the control of the second divider stage, and the control voltage are combined to fulfill the condition sin $(\omega_0 t \pm 90°)$.

A further object of the invention is to provide a circuit arrangement for the production of two pulse series which are phase shifted by 90° in relation to each other and one of which can be selectively made to lead or lag the other with the aid of an auxiliary voltage, and utilizing two divider stages controlled by pulse series phase-shifted in relation to each other by 180° and a gating stage connected to at least one input of the second divider stage.

Still another object of the invention is to provide a circuit arrangement of the type just described in which the gating circuit consists of an AND gate and an AND-NOT gate connected in parallel.

Yet a further object of the invention is to provide a circuit arrangement as just described including means permitting a selective switching of the pulse series from the first bistable frequency divider stage to either one of the two gates just mentioned.

Yet another object of the invention is to provide a circuit arrangement of the type just described in which the selective switching means comprises a further AND gate and a further AND-NOT gate.

Brief description of the drawings

For an understanding of the principles of the invention, reference is made to the following description of a typical embodiment thereof as illustrated in the accompanying drawings.

In the drawings.

Description of the preferred embodiment

Figure 1:
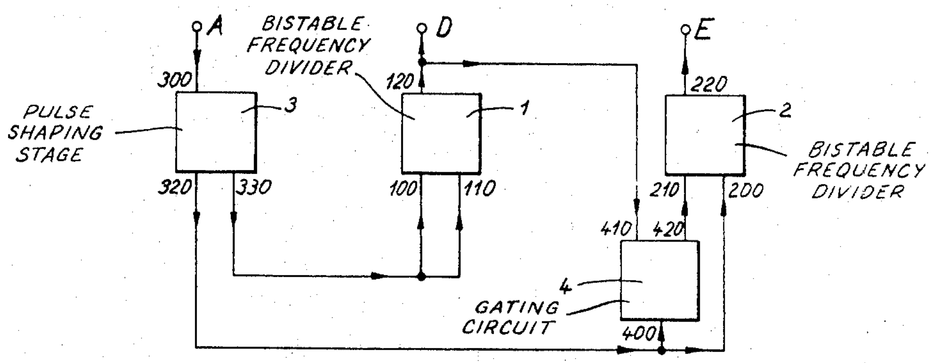
Fig.1 PRIOR ART
FIG. 1 is a schematic block diagram of a known phase-shifting circuit arrangement.

Referring first to the known circuit arrangement shown in FIG. 1, a pulse former stage 3 is illustrated as having a single input 300 and two outputs 320 and 330. Output 330 is applied to the inputs 100 and 110 of a first bistable frequency divider stage 1, and output 320 is applied to an input 200 of a second bistable frequency divider stage 2, and is also applied to the input 400 of a gate circuit 4. First bistable divider 1 has an output 120 which is applied to a second input 410 of gate circuit 4. Gate circuit 4 has an output 420 which is applied to the input 210 of second bistable frequency divider stage 2.

By way of example, the pulse former stage 3 may comprise a bistable multi-vibrator or a Schmitt trigger circuit. However, in the case of a bistable multi-vibrator as the pulse former stage 3, the pulse series applied to input 300 must have double the frequency of the pulse series applied when a Schmitt trigger circuit is used.

The function of pulse former stage 3 is to produce, from a single pulse series applied to input 300, two identical pulse series which are phase-shifted in relation to each other by 180°. The pulse series A at the input 300 of pulse former stage 3 is shown in line A of FIG. 2, while the two phase-shifted output pulse series are shown in lines B and C of FIG. 2. Specifically, the output pulses at output 330 are shown in line B, and the output pulses at output 320 are shown in line C. Each output pulse from output 330 of pulse former stage 3, indicated in line B of FIG. 2, switches first bistable frequency divider stage 1 from one stable stage to the other. Thus, there appears at output 120 of first bistable frequency divider stage 1 a pulse series D as illustrated in line D of FIG. 2.

Figure 2:
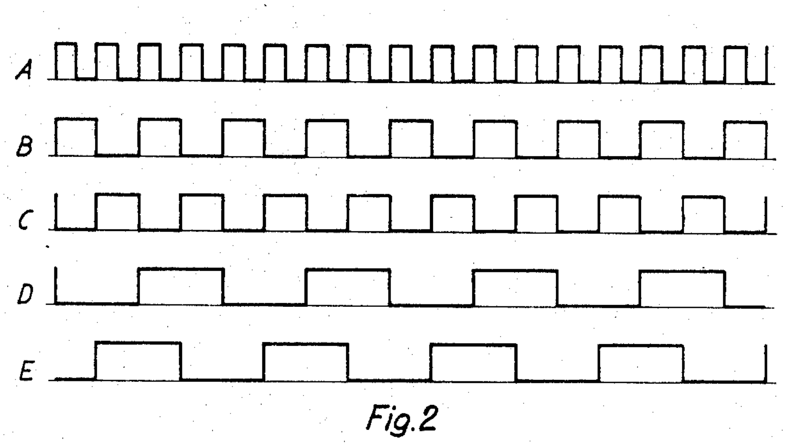
FIG. 2 is a graphic comparison of the several pulse series provided by the circuit of FIG. 1.

In the simplest case, the gating circuit 4 is an ordinary AND gate, with the pulse series of line C of FIG. 2 being applied to its input 400 and the pulse series of line D of FIG. 2 being applied to its input 410. Thus, a pulse of line C can be transmitted through gating circuit 4 only when it appears at input 400 at the same time that a pulse of line D appears at input 410. The controlled pulse series D and the pulse series C switch the second bistable frequency divider stage 2.

As stated, there is formed at output 120 of bistable frequency divider stage 1 the pulse series D (FIG. 2), and at the output 20 of bistable frequency divider stage 2 there is formed the pulse series E of FIG. 2. These two pulse series, D and E, are phase-shifted by 90° in relation to each other. The effect of gating circuit 4 is that the phase shift always occurs in the same direction. For example, if output 120 of first bistable frequency divider stage 1 were used for the control, the phase position of pulse series E would be shifted accordingly by 90° relative to the pulse series D.

Figure 3:
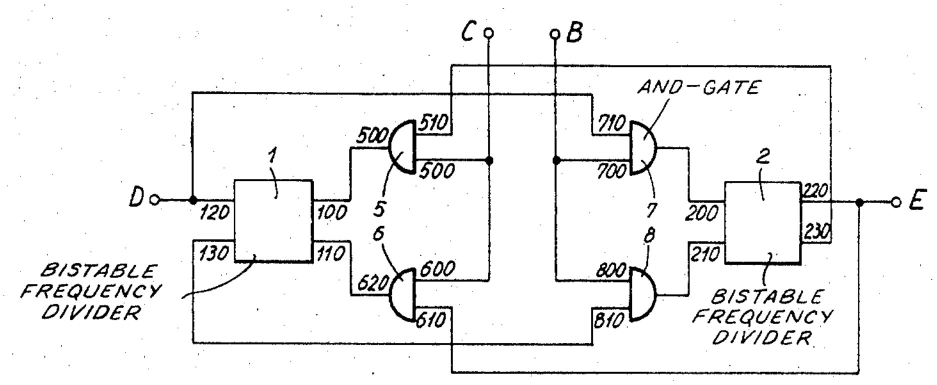
Fig.3 PRIOR ART
FIG. 3 is a schematic block diagram of another known phase shifting circuit arrangement.

Referring to FIG. 3, the known circuit arrangement therein illustrated includes the two bistable frequency divider stages 1 and 2 having inputs 100, 110 and 200, 210, respectively, as well as the respective outputs 120, 130 and 220, 230. The two pulse series B and C from pulse former stage 3 of FIG. 1 are applied to the respective terminals B and C of FIG. 3. Terminal C is connected in parallel to inputs 500 and 600 of AND gates 5 and 6, respectively, and terminal B is connected to inputs 700 and 800 of AND gates 7 and 8, respectively. Output 220 of bistable frequency divider stage 2 is applied to the second input

610 of AND gate 6, and output 230 of bistable frequency divider stage 2 is applied to the second input 510 of AND gate 5. In a like manner, output 120 and 130 of bistable frequency divider stage 1 are connected with the second inputs 710 and 810 of AND gates 7 and 8, respectively.

If the pulses of lines B and C of FIG. 2 are applied to the like designated terminals B and C of FIG. 3, bistable frequency divider stages 1 and 2 can switch only when the second frequency divider stage is in a certain state. At the terminals D and E of FIG. 3, the same pulse series appear as at the terminals D and E of FIG. 1. The only difference between the known examples of FIGS. 1 and 3 is that, in the known circuit arrangement of FIG. 3, all outputs 120, 130 and 220, 230 of bistable frequency divider stages 1 and 2 are loaded uniformly.

The two examples of FIGS. 1 and 3 illustrate a known arrangement for producing two pulse series phase-shifted by 90° using divider stages with mutual control. The arrangement of the invention, as shown in FIG. 4, constitutes an improved circuit arrangement whereby one pulse circuit can be connected selectively either to lead or to lag.

Figure 4:
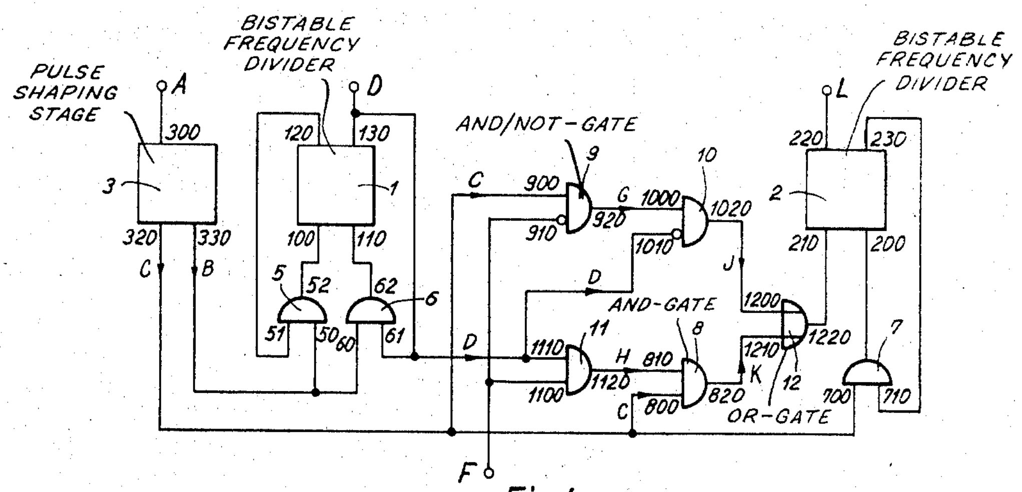
FIG. 4 is a schematic block diagram of the circuit arrangement embodying the invention.

Referring to FIG. 4, the pulse former stage 3 is again illustrated as having an input 300 and outputs 320 and 330. The arrangement futher includes first bistable frequency divider stage 1 having inputs 100, 110 and outputs 120, 130, and second bistable frequency divider 2 having inputs 200, 210 and outputs 220, 230. AND-NOT gate 5 is again indicated as connected to input 100, and AND-NOT gate 6 is indicated as connected to input 110, both these inputs being inputs for first bistable frequency divider stage 1. Also, AND-NOT gate 7 is connected to input 200 and AND gate 8 to input 210 of second bistable frequency divider stage 2.

The gating circuit schematically illustrated at 4 in FIG. 1 includes, in the invention arrangement of FIG. 4, AND-NOT gates 9 and 10, an AND gate 11 and an OR gate 12. A terminal F is provided which is connected to the inputs 910 and 1100, respectively, of AND-NOT gate 9 and AND gate 11. Terminal F may have applied thereto either a positive potential or a zero potential. The gates of the gate circuit 4 are so interconnected that, with switching from a positive potential to a zero potential at terminal F, there will appear, at output L of second bistable frequency divider stage 2, a pulse series phase-shifted by 90°. AND-NOT gates 5, 6 and 7 are connected in a known manner between the output and one input of bistable frequency divider stages 1 and 2, so that the state variation of the bistable frequency divider stages is insured. Gates 5 and 6 are further loaded by the pulses B from output 330 of pulse former stage 3, while gate 7 is further loaded by pulses C from output 320 of pulse former stage 3. Output 130 of bistable frequency divider stage 1, and the pulses C from output 320 of pulse former stage 3, are applied through the gating circuit to input 210 of bistable frequency divider stage 2.

In the circuit arrangement of FIG. 4, the pulse series C at the output 320 of pulse former stage 3 is applied to the input 900 of AND-NOT gate 9, and the potential at terminal F is operative at the inverted input 910 of gate 9. Output 920 of gate 9 is applied to input 1000 of AND-NOT gate 10, and the pulse series D from output 130 of bistable frequency divider stage 1 is applied to the inverted input 1010 of AND-NOT gate 10. Output 1020 of gate 10 is connected with one input 1200 of OR gate 12.

One input 1100 of AND gate 11 has applied thereto the potential at terminal F, and the other input 1110 of gate 11 has applied thereto the pulse series D appearing at output 130 of bistable frequency divider stage 1. Output 1120 of AND gate 11 is connected to input 810 of the additional AND gate 8, and the second input 800 of gate 8 has applied thereto the pulses C appearing at output 320 of pulse former stage 3. Output 820 of gate 8 is connected with input 1210 of OR gate 12, and the output

1220 of gate 12 is connected with input 210 of bistable frequency divider stage 2.

Figure 5:
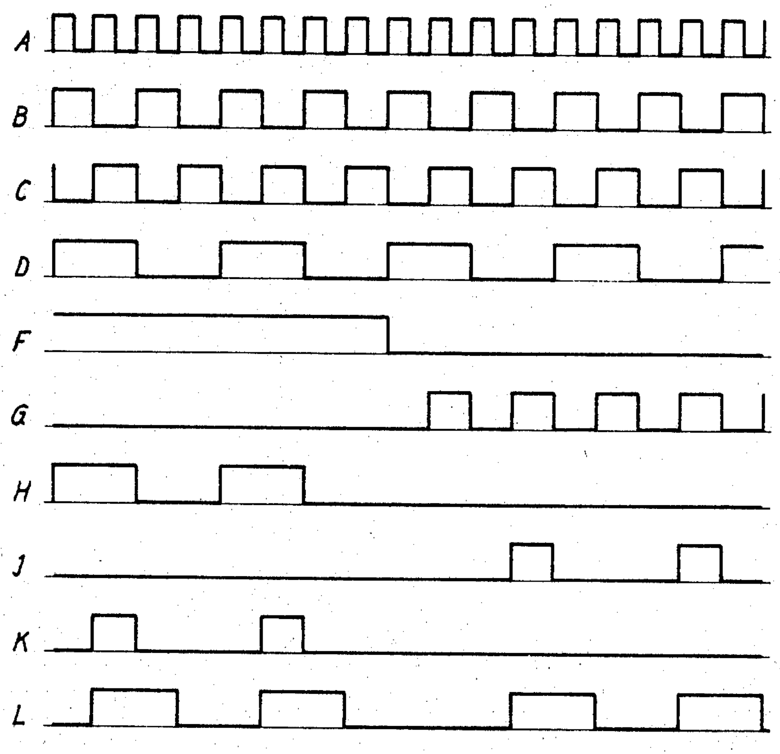
FIG. 5 is a graphic comparison and voltage diagram of the pulse series of the circuit arrangement shown in FIG. 4.

The operation of the circuit arrangement shown in FIG. 4 will be made apparent by reference to FIG. 5. In the same manner as in FIG. 2, the pulse series of line A of FIG. 5 is applied to input 300 of pulse former stage 3. At the outputs 330 and 320 of pulse former stage 3, there appear the pulse series B and C which are phase-shifted in relation to each other by 180°. The pulse series B loads bistable frequency divider stage 1 to produce the pulse series D which is synchronous with the pulse series B but has one-half the frequency of the pulse series B.

Let it be assumed that, in a first case, the voltage at terminal F is positive. AND-NOT gate 9 is blocked by this positive voltage, while AND gate 11 is conducting. Pulses D are thus conducted to AND gate 8, and this gate, for the duration of pulses B, is conducting for pulses C. This forms a pulse train K as shown in the correspondingly lettered line of FIG. 5, and which appears at the output 820 of AND gate 8.

Let it now be assumed that, in a second case, the potential at terminal F is zero. AND-NOT gate 9 is thus conductive for pulse series C, and pulses C are conducted, as pulses G, through AND-NOT gate 10. However, AND-NOT gate 10 is conductive only for the duration of the gaps or intervals between the pulses of the pulse series D. Thus, only those pulses G which are in time-coincidence with the intervals between pulses D reach OR gate 12. At output 1020 of AND-NOT gate 10 there appears a pulse series J as illustrated in the correspondingly lettered line of FIG. 5.

Bistable frequency divider stage 2 is controlled by pulses J and K. The pulse series at output 220, represented in line L of FIG. 5, thus either leads by 90° or lags by 90° with respect to pulse series D depending on whether the potential at connection F is positive or is zero.

What is claimed is:

1. A circuit arrangement for producing two output pulse series phase shifted relative to each other by 90°, with one series being selectively controllable either to lead or to lag the other series, said circuit arrangement comprising, in combination, first and second frequency divider stages, producing output pulse series; means producing two control pulse series phase shifted relative to each other by 180°; circuit means applying said control pulse series to control said first and second frequency divider stages; a source of potential selectively switchable between a constant potential and zero potential; a gating stage having an output connected to at least one input of said second frequency divider stage; and circuit means applying output pulses of said first divider stage, one of said control pulse series and said source of potential to said gating stage; the selected potential of said source determining whether the output pulse series of said second divider stage leads or lags, by 90°, the output pulse series of said first frequency divider stage.

2. A circuit arrangement, as claimed in claim 1, in which said gating stage comprises an AND gate and an AND-NOT gate connected in parallel; and means, including said source of potential, providing a selective switching of the output pulse series of said first divider stage between said two gates.

3. A circuit arrangement, as claimed in claim 2, in which said last-named means further includes a second AND gate and a second AND-NOT gate.

4. A circuit arrangement, as claimed in claim 2, including an OR gate having a pair of inputs, one connected to said AND gate and the other connected to said AND-NOT gate, the output of said OR gate being connected to said one input of said second frequency divider stage.

5. A circuit arrangement, as claimed in claim 3, in which said source of potential is connected to one input of said second AND gate and to one input of said second AND-NOT gate.

6. A circuit arrangement, as claimed in claim 5, in which the output of said second AND-NOT gate is connected to one input of said first AND-NOT gate, and the output of said second AND gate is connected to an input of said first AND gate.

References Cited

UNITED STATES PATENTS

| | | | |
|---|---|---|---|
| 2,971,086 | 2/1961 | Feijoo et al. | 328—133 |
| 3,134,076 | 5/1964 | Haner et al. | 328—133 |
| 3,200,340 | 8/1965 | Dunne | 307—232 XR |
| 3,292,100 | 12/1966 | Berlind | 307—262 XR |
| 3,293,547 | 12/1966 | Weissker | 307—262 XR |

ARTHUR GAUSS, Primary Examiner

STANLEY T. KRAWCZEWICZ, Assistant Examiner

U.S. Cl. X.R.

307—243, 262; 328—39, 61, 93, 97, 155